(12) United States Patent
Jasra et al.

(10) Patent No.: US 7,560,093 B2
(45) Date of Patent: Jul. 14, 2009

(54) PROCESS FOR PREPARING DETERGENT BUILDER ZEOLITE-A FROM KIMBERLITE TAILINGS

(75) Inventors: Raksh Vir Jasra, Bhavnagar (IN); Rajesh Shantilal Somani, Bhavnagar (IN); Haresh Mahipatlal Mody, Bhavnagar (IN); Hari Chand Bajaj, Bhavnagar (IN); Jatin Rameshchandra Chunawala, Bhavnagar (IN); Hemal Ranpara, Bhavnagar (IN); Dipti Barochiya, Bhavnagar (IN); Devendra Ghelani, Bhavnagar (IN); Suresh Chandra, Hyderabad (IN); Maharaj Kishen Dhar, Hyderabad (IN); Keshav Rao, Hyderabad (IN); Kamlesh Kumar, Hyderabad (IN)

(73) Assignees: Council of Scientific and Industrial Research (IN); National Mineral Development Corporation Limited (IN)

( * ) Notice: Subject to any disclaimer, the term of this patent is extended or adjusted under 35 U.S.C. 154(b) by 0 days.

(21) Appl. No.: 12/016,970

(22) Filed: Jan. 18, 2008

(65) Prior Publication Data

US 2008/0311033 A1    Dec. 18, 2008

Related U.S. Application Data

(63) Continuation of application No. 11/024,369, filed on Dec. 27, 2004, now abandoned.

(51) Int. Cl.
*C01B 39/14*    (2006.01)
(52) U.S. Cl. ............................ 423/712; 423/DIG. 24; 510/507; 510/532

(58) Field of Classification Search ................. 423/712, 423/DIG. 24; 510/507, 532
See application file for complete search history.

(56) References Cited

U.S. PATENT DOCUMENTS

| 2,841,471 | A |   | 7/1958 | Sensel |
| 2,847,280 | A |   | 8/1958 | Estes |
| 3,101,251 | A |   | 8/1963 | Howell |
| 4,089,929 | A |   | 5/1978 | Christophliemk et al. |
| 4,247,524 | A | * | 1/1981 | Leonard ..................... 423/709 |
| 4,271,130 | A | * | 6/1981 | Endres et al. ............... 423/712 |

(Continued)

FOREIGN PATENT DOCUMENTS

FR            1404467        12/1964

(Continued)

OTHER PUBLICATIONS

Synthesis of Zeolite—A and X from Kaolinite activated by Mechanochemical treatment by Wantae Kim et al published in Journal of Chemical Engineering of Japan, 2000, vol. 3, No. 2, pp. 217-222.

(Continued)

*Primary Examiner*—David M Brunsman
(74) *Attorney, Agent, or Firm*—Darby & Darby (57) ABSTRACT

The present invention provides a process for the preparation of detergent builder Zeolite-A from Kimberlite tailing generated as solid waste during diamond mining is disclosed. The process comprises, reacting an acid treated Kimberlite tailing with alkali solution to obtain sodium silicate and reacting it with alkaline aluminum source at room temperature and crystallizing at higher temperature to obtain Zeolite-A. The product is useful as builder in detergent formulation.

24 Claims, 2 Drawing Sheets

U.S. PATENT DOCUMENTS

| | | | | |
|---|---|---|---|---|
| 4,401,634 A | * | 8/1983 | Sun | 423/710 |
| 4,405,484 A | | 9/1983 | Miyazaki et al. | |
| 5,401,487 A | * | 3/1995 | Puerto et al. | 423/712 |
| 5,965,105 A | | 10/1999 | Rayalu et al. | |
| 6,451,282 B1 | * | 9/2002 | Siklosi et al. | 423/712 |
| 6,641,796 B2 | | 11/2003 | Micco et al. | |
| 6,773,693 B2 | | 8/2004 | Hosokawa et al. | |
| 7,037,476 B1 | * | 5/2006 | Jasra et al. | 423/339 |

FOREIGN PATENT DOCUMENTS

| | | |
|---|---|---|
| IN | 82635 | 5/1999 |
| IN | 182636 | 5/1999 |
| JP | 54-81200 | 6/1979 |

OTHER PUBLICATIONS

"Annual Report 2002-03: Chapter-VI Research and Development", Internet Article, 'Online! 2003, pp. 1-20, XP002327131.

* cited by examiner

PROCESS FOR PREPARING DETERGENT BUILDER ZEOLITE-A FROM KIMBERLITE TAILINGS

This application is a Continuation of 11/024,369, filed 27 Dec. 2004 now abandoned.

FIELD OF THE INVENTION

The present invention relates to a process for the preparation of detergent builder Zeolite-A form Kimberlite tailings. More particularly, the present invention relates to the use of active silica content of Kimberlite tailings to prepare detergent builder Zeolite-A in a manner that allows the preparation of sodium silicate and further interact with soluble aluminate species in aqueous form to obtain the Zeolite-A.

BACKGROUND OF THE INVENTION

Zeolites are crystalline aluminosilicates with a regular three-dimensional porous lattice structure built up from $SiO_4"$ and $AlO_4"$ tetrahedra in which the negative charges are compensated by mono or multivalent cations. These cations are exchangeable without the lattice structure being destroyed. Their use as water softener is mainly attributed to this property. Hard water contains calcium and/or magnesium salts, which greatly reduce the surfactant effect of soaps and detergents. The exchange of sodium ions present in the zeolite for the calcium and magnesium ions present in the water softens the hard water. Generally, phosphates are used as builder in household detergents. Due to the increasing awareness about the polluting effect and non-biodegradable property of phosphates, many countries have banned or curtailed the use of phosphates in household detergents. Zeolite-A is established as the most suitable substitute for phosphate builder in detergents. Under the circumstances, use of Zeolite-A is increasing as detergent builder.

Zeolites are inorganic materials having high thermal and hydrothermal stability. These materials are also chemically stable at ambient temperatures towards may organic compounds. Zeolites owing to the presence of molecular dimensional pores are also used as molecular sieves and as adsorbents for drying, purification and separation of compounds. They have significant adsorption capacity of water even at very low partial pressures and hence are effective desiccants, with a capacity of up to more than 25% of their weight. They are also used to remove volatile organic chemicals from air streams, separate isomers and mixtures of gases.

Zeolites can act as shape-selective catalysts either by transition state selectivity or by exclusion of competing reactants on the basis of molecular diameter. Zeolites have also emerged as solid acid catalysts and have substituted conventional acids like sulphuric acid in many applications. A variety of organic transformations, namely, alkylation, acylation, isomerisations, oxidation is being carried out employing zeolite based catalysts where zeolite acts as a catalyst or catalyst support. The industrial sectors where zeolites have made substantial impact as catalysts and adsorbents include: petroleum refining, synfuels production, and petrochemical production.

The largest volume wise application of zeolite is in detergent industry with Zeolite-A being used as detergent builder. The specific properties which make Zeolite-A suitable as phosphate substitute detergent builder include:

The high cation exchange capacity even at higher temperature makes Zeolite-A effective in removal of water hardness ions, particularly calcium.

It gives alkaline reaction in aqueous medium with pH less than 12.

It does not cause encrustation on the fabric.

Detergent grade Zeolite-A crystals are cubic in shape with rounded corners and edges and can pass through the mesh of the fabrics allowing easy removal during rinsing.

The surfactant adsorption capacity of the Zeolite-A is several times higher than the polyphosphates.

Zeolite-A absorbs unwanted water-soluble molecules from the dirt.

It coagulates the colloidal dirt particles and pigments causing easy removal from the aqueous phase.

It does not clog the sewerage.

It does not exert any negative influence upon biological sewerage purification.

It does not remobilize heavy metals.

Zeolite-A is toxicologically innocuous.

Conventionally, Zeolite-A is synthesized using aluminum and silicon rich material as the stating materials in the presence of au alkali. Aluminum trihydrate, Aluminum alkoxide, and Sodium aluminate are used as aluminum source and fume silica, sodium silicate and colloidal silica are employed as silica source. Mixing solutions of silicate and aluminate produce aluminosilicate gel that precipitates. The gel thus formed is then crystallized to Zeolite-A by aging in the mother liquor at higher temperature. Such processes are described; for example, in U.S. Pat. Nos. 2,841,471 and 2,847,280 (1958), and in French Patent 1,404,467.

The cost of production of Zeolite-A depends largely on the starting materials used, especially, for the detergent builder Zeolite-A, where the volumes employed are very large. Since conventional detergent builders like sodium tripolyphosphate (STPP) are economically attractive compared to Zeolite-A, in many countries there is a resistance to substitute STPP by Zeolite-A in spite of eco-friendly nature of the latter. Therefore, research efforts are directed towards developing a process for Zeolite-A synthesis wherein the Zeolite-A developed can be economically competitive to STPP.

Kimberlite tailings are produced as a huge solid waste during diamond mining. For example, in a country like India from its Panna diamond mines, typically around 100 tones of Kimberlite is generated per 10 carat of diamond mined. Around 3-4 million tones of Kimberlite is already accumulated during previous diamond mining in India. With an estimated life of 20 years for the Panna diamond mines, huge quantity of Kimberlite tailing is likely to be available in the country. Considering this problem on the global scale, as countries like South Africa and Canada are also involved in diamond mining, the quantity of Kimberlite tailings to be generated is of a serious concern. Therefore, it is pertinent to look for technical solutions to gainfully utilize Kimberlite tailings accumulated during diamond mining. The Kimberlite being rich in magnesia and silica, there is an opportunity to develop magnesium and silica based products from this materials. Therefore, efforts were made to prepare value-added product like Zeolite-A. The value-addition of Kimberlite will not only make diamond mining process more economical but will also make it an eco-friendly. Kimberlite with a typical chemical composition given below is rich source of silica and therefore considered as a potential starting material for the preparation of Zeolite-A.

The typical chemical composition of Kimberlite is given below:

$SiO_2$ 30-32%, $Al_2O_3$ 2-5%, $TiO_2$ 5-8%, CaO 8-10%, MgO 20-24%, $Fe_2O_3$ 5-11%, LOI 13-15%.

U.S. Pat. No. 3,101,251 (1963) discloses a process for producing Zeolite-A wherein a non-kaolinitic aluminosilicate in admixture with an alkali metal hydroxide is fused at a temperature from 330 to 370° C. An aqueous reaction mixture is formed with this fused admixture. This reaction mixture has water to sodium oxide molar ratio of from 35:1 to 200:1, a sodium oxide to silica molar ratio of from 1.3:1 to 2, 5:1, and silica to alumina molar ratio of from 0.8:1 to 3:1. This reaction mixture is reacted at a temperature from 20 to 120° C. until Zeolite-A is formed. The process has limitations of high temperature alkali fusion of aluminum and silica contain solids prior to crystallization.

U.S. Pat. No. 5,965,105 (1999) disclosed a process for the synthesis of Zeolite-A using fly ash. In this process, fission mixture was obtained by mixing fly ash and caustic soda in a ratio of 1:1.2 and optionally adding sodium aluminate or aluminium hydroxide. This fusion mixture was heated at 500-600° C. for about 1-2 hours, to obtain a fused mass. This fused mass was treated with distilled water for 8-10 hours with simultaneous optional addition of sodium aluminate or alum solution, in the presence or absence of NaCl, followed by optional addition of Zeolite-A seeds to obtain amorphous aluminosilicate slurry; subjecting said slurry to hydrothermal crystallization at about 90-110° C. for 2 to 4 hours to obtain Zeolite-A crystals. However, this process requires very high reaction temperature and high processing time in cooling, milling and mixing, moreover, seeding of Zeolite-A crystal is also necessary. The process has limitation of fusion of fly ash and caustic soda at a high temperature of 500-600° C. making the process energy intensive.

Production of high purity fine size Zeolite-A by adding organic acid to silica and/or alumina-silica, sodium aluminate and sodium hydroxide is described in Japanese Patent 54,081, 200, (1997). The limitation of this patent is that the addition of organic acid to silica and alumina source is required.

U.S. Pat. No. 4,089,929 describes use of mineral aluminosilicate raw materials to produce low-iron zeolitic-aluminosilicates. Methods for preparation and use of zeolite containing cation exchanger using expanded clays/ceramics are described in U.S. Pat. No. 5,976,490. These processes include calcination of raw materials which is an energy intensive process. Calcined material is treated further with alkali solution to produce desired product.

U.S. Pat. No. 4,405,484 (1983), describes a process for preparing zeolite powder having high flow ability i.e. general flow index (expressed as the sum of indexes of the repose angle, spatula angle, compressibility and degree of cohesiveness) of from 30 to about 50 and at least 99 weight % of particles are having a particle size of 1-5 microns. The zeolite powder is prepared by adding an alkali metal aluminate to an aqueous zeolite slurry containing 30-52 wt. % of zeolite (as anhydride) and having pH of not higher to 12.8; adjusting the pH of the slurry to a value not higher than 11; and then, drying the slurry. The zeolite powder is useful as a builder for detergent. The process requires pH adjustment and zeolite slurry.

Indian Patents 182635 and 182636 describe improved processes for preparing aluminosilicate gel and manufacture of detergent grade zeolite from it under milder conditions of temperature and time. However, the use of commercially available sodium aluminate powder as a source of alumina is contributing much to the production cost.

Wantae Kim et al. (Journal of Chemical Engineering of Japan, Vol. 33, No. 2, pp. 217-222, 2000) investigated a novel process for synthesizing Zeolite-A and X from kaolinite activated by dry grinding. The process consists of grinding of kaolinite and subsequent reaction with NaOH solution at 60° C. Zeolite-A and X can be synthesized from the process under normal pressure. Crystallization of Zeolite-A and X is influenced by the activated state of kaolinite. The drawback associated with this is the requirement of grinding which is an energy intensive process.

U.S. Pat. No. 6,641,796 describes a method for making zeolites and zeolite mixtures having enhanced cation exchange properties i.e. >200 mg $CaCO_3$/gram anhydrous zeolite. This method include mixing a sodium silicate solution, a sodium aluminate solution, and an amorphous aluminosilicate initiator got in a mixing vessel to create an aluminosilicate synthesis get and crystallizing the aluminosilicate synthesis gel to form zeolite crystals. The drawback of this method is the requirement of initiator gel to produce aluminosilicate synthesis gel.

U.S. Pat. No. 6,773,693 describes preparation of fine. A-type zeolite particle having an average primary particle size of 0.1 mμm or less. The process for preparing the fine A-type zeolite particle comprise reacting a silica source with an aluminum source in presence of an organic compound having an oxygen-containing functional group and a molecular weight of 100 or more. Requirement of adding organic compound is a limitation of this process.

OBJECTS OF THE INVENTION

The main object of the invention is to provide a process for preparing detergent builder Zeolite-A from Kimberlite tailing which obviates the drawbacks detailed above.

Another object of the invention is to make use of silica content present in Kimberlite tailings for the preparation of detergent builder Zeolite-A.

Still another object of the invention is to prepare detergent builder Zeolite-A at atmospheric pressure and high temperature in the range 70 to 100° C.

Yet another object of the invention is to prepare detergent builder Zeolite-A having molar ratio of $SiO_2/Al_2O_3=2.0\pm0.1$, $Na_2O/Al_2O_3=1.0\pm0.1$ and $H_2O/Na_2O=4$ to 5.

Yet another object of the invention is to prepare Zeolite-A having calcium binding capacity 160-170 mg CaO per gram of absolute dry zeolite which makes it suitable as a detergent builder.

Yet another object of the invention is to provide a process for preparing Zeolite-A with crystalinity>98% as measured by X-Ray diffraction and average particle size<5.0 μm, as measured by Laser diffraction with whiteness index of >97% measured by Digital reflectance meter.

The objects and other objects of the invention were achieved by the methods provided in the following detailed description.

SUMMARY OF THE INVENTION

The present invention discloses a process for the preparation of detergent builder Zeolite-A from Kimberlite tailings by preparing sodium silicate from acid treated Kimberlite which is rich in silica content (~70-75%).

The present invention provides a process for the preparation of Zeolite-A from Kimberlite tailings, the process comprising:

i. treating sieved Kimberlite tailings fraction with a mineral acid to remove acid soluble impurities as filtrate and obtain a residue;

ii. washing the residue with demineralized water till the residue is free from acid;

iii. digesting the acid treated Kimberlite tailing residue with an alkali to obtain sodium silicate;

iv. adding desired quantity of caustic soda solution to sodium silicate;
v. preparing sodium aluminate solution by dissolving required quantity of alumina trihydrate in sodium hydroxide solution;
vi. removing insoluble impurities present in sodium aluminate solution;
vii. dosing the sodium aluminate solution to the sodium silicate solution to form amorphous aluminosilicate gel;
viii. heating the aluminosilicate gel to convert amorphous aluminosilicate gel to crystalline Zeolite-A in a product slurry;
ix. cooling the product slurry and separating the Zeolite-A as a wet cake from a filtrate.
x. washing the wet cake with demineralized water;
xi. drying the washed wet cake of the product;
xii. pulverizing the dried wet cake.

In another embodiment of the invention, the Zeolite-A is obtained as a fine powder with a whiteness index greater than 98%, calcium binding capacity 160-170 mg CaO/g of absolute dry zeolite, crystallinity greater than 98% and average particle size less than 5.0 microns.

In another embodiment of the invention, the Kimberlite tag is first sieved by passing through 60 Mesh and has chemical constituents in the range $SiO_2$ 30-32%, $Al_2O_3$ 2-5%, $TiO_2$ 5-8%, CaO 8-10%, MgO 20-24%, $Fe_2O_3$ 5-11% and loss on ignition 13-15%.

In another embodiment of invention, the mineral acid is selected from the group consisting of HCl and $HNO_3$ in a concentration in the range of 1 to 10 N.

In yet another embodiment of the invention the acid treatment is carried out at a temperature in the range of 75 to 100° C. for a period in the range of 1 to 6 hours.

In another embodiment of the invention the acid treated Kimberlite tailing has a chemical composition in the range of $SiO_2$ 73-77%, $R_2O_3$ 3-4%, $TiO_2$ 10-13%, CaO+MgO 0.5-1.0% and loss on ignition 5-6%.

In another embodiment of the invention, the acid treated Kimberlite tailings are treated with sodium hydroxide solution in a concentration in the range of 6 to 10%.

In a further embodiment of the invention, the alkali treatment is carried out at either boiling temperature in an open vessel or at a temperature in the range of 95 to 200° C. in a closed vessel and for a period in the range of 1 to 6 hours.

In another embodiment of the invention, the $Na_2O/SiO_2$ mole ratio in step (iv) is varied in the range of 0.6 to 1.0.

In another embodiment of the invention, in step (iv) the $Na_2O/SiO_2$ mole ratio is in the range of 0.5 to 1.0 and $H_2O/Na_2O$ mole ratio is in the range of 30 to 40.

In another embodiment of the invention, aluminum trihydrate powder having $Al_2O_3$ content in the range of 63 to 65% is added to the caustic soda solution and the mass heated to temperature in the range of 70 to 100° C. till complete dissolution takes place.

In another embodiment of the invention, the $Na_2O/Al_2O_3$ mole ratio is in the solution obtained in step (v) is varied in the range of 1.8 to 2.2 and $H_2O/Na_2O$ mole ratio is in the range of 25 to 30.

In another embodiment of present invention, in step (vi) the insoluble impurities in step (vi) are removed from the sodium aluminate solution by filtration or flocculated and settled using a flocculating agent.

In another embodiment of the invention, in step (vii) the sodium aluminate solution of step (vi) is added to the sodium silicate solution of step (iv) under continuous stirring at ambient temperature it the range of 25 to 40° C. and for a period 30 to 120 minutes.

In another embodiment of the invention, the aluminosilicate gel has a composition $3.2\pm0.1$ $Na_2O$: $2.0\pm0.2$ $SiO_2$: $Al_2O_3$: $105\pm10H_2O$ and is agitated at room temperature for 10 to 15 minutes.

In another embodiment of the invention, the gel containing amorphous aluminosilicate is crystallized by heating at a temperature in the range of 70 to 100° C. for a period in the range of 1 to 5 hours to convert the amorphous solid to crystalline Zeolite-A.

In another embodiment of the invention, the product slurry obtained at the end of step (viii) is cooled in step (ix) in a stainless steel jacketed reactor and the product Zeolite-A separated by filtration.

In one embodiment of the invention, the filtrate obtained in step (ix) contains NaOH and minor quantities of $SiO_2$ and $Al_2O_3$ and is recycled in the process.

In another embodiment of the invention, the wet cake of the product is washed with demineralized water till pH of the wash water is between 10.5 and 11.

In another embodiment of the invention, the washed wet cake of product contains 40 to 50% moisture and is dried in a dryer at 110° C. for 5 to 7 hours.

In another embodiment of the invention, the dried lumps of the product are pulverized in micro or impact type pulverizer.

The present invention also provides a process for the preparation of detergent builder Zeolite-A from Kimberlite tailing generated as solid waste during diamond mining having chemical constituents in the range $SiO_2$ 30-32%, $Al_2O_3$ 2-5%, $TiO_2$ 5-8%, CaO 8-100%, MgO 20-24%, $Fe_2O_3$ 5-11% and loss on ignition 13-15% which comprises passing the Kimberlite tailing through 60 mesh screen and treat the sieved fraction with 1 to 10 N hydrochloric or nitric acid at temperature in the range of 75 to 100° C. for a specified period in the rage of 1 to 6 hours to remove acid soluble impurities, recovering the acid treated Kimberlite tailing after washing with demineralized water till free from acid and digesting the acid treated Kimberlite tailing having chemical composition in the range of $SiO_2$ 73-77%, $R_2O_3$ 3-4%, $TiO_2$ 10-13%, CaO+MgO 0.5-1.0% and loss on ignition 5-6% with an alkali such as sodium hydroxide solution having concentration in the range 6 to 10 percent at 95-200° C. for a period of 1 to 6 hours either in an open vessel or in a closed system to prepare sodium silicate having 13-21% $SiO_2$ and 4-7% $Na_2O$ with molar ratio of $SiO_2:Na_2O=2.8$-3.3, adjusting the $Na_2O/SiO_2$ mole ratio in the range of 0.5 to 0.8 and $H_2O/Na_2O$ mole ratio in the range of 30 to 40 by adding sodium hydroxide solution, dosing the sodium aluminate solution prepared separately by dissolving required quantity of aluminum trihydrate in sodium hydroxide solution at 70 to 100° C. so as to obtain $Na_2O/Al_2O_3$ mole ratio in the range of 1.8 to 2.2 and $H_2O/Na_2O$ mole ratio in the range 25 to 30, to the sodium silicate solution under continuous stirring at ambient temperature in the range of 25 to 40° C. and in a specified period in the range of 30 to 120 minutes to form aluminosilicate gel, heating the gel having composition $3.2\pm0.1$ $Na_2O$: $2.0\pm0.2$ $SiO_2$: $Al_2O_3$: $105\pm10$ $H_2O$ in the temperature range of 70 to 100° C. for a time in the range of 1 to 5 hours there by converting the amorphous aluminosilicate gel to crystalline Zeolite-A, cooling the product slurry to <50° C. and separating the product by conventional filtration technique, storing the filtrate mainly containing sodium hydroxide and minor quantities of $SiO_2$ & $Al_2O_3$ in a storage tank which may be recycled in the process, washing the wet cake of the product with demineralized water till the pH of the wash water is between 11 and 10.5, drying the washed wet cake of the product containing 40 to 50% moisture in a dryer at 110° C. for 5 to 7 hours followed by pulverizing the dried lumps of the product using micro or impact type pulverizer and the powder product is stored in appropriate container or silos.

BRIEF DESCRIPTION OF THE ACCOMPANYING DRAWINGS

In the drawings accompanying this specifications

DETAILED DESCRIPTION OF THE INVENTION

In the process of the present invention detergent builder Zeolite-A is prepared from Kimberlite tailings generated as solid waste during diamond mining. Kimberlite tailings are treated first with mineral acid to remove acid soluble impurities, followed by treatment of alkali solution with silica rich acid treated Kimberlite to obtain sodium silicate which is further treated with sodium aluminate to obtain aluminosilicate gel and subsequently heated to produce crystalline Zeolite-A. The product Zeolite-A is suitable as detergent builder.

The present invention relates to a process for the preparation of detergent builder Zeolite-A from Kimberlite tailings which comprises i. passing Kimberlite tailings generated during diamond mining through 60 Mesh screen.
ii. treating the sieved (–60 mesh) fraction having chemical constituents in the range $SiO_2$ 30-32%, $Al_2O_3$ 2-5%, $TiO_2$ 5-8%, CaO 8-10%, MgO 20-24%, $Fe_2O_3$ 5-11% and loss on ignition 13-15%, with mineral acid such as hydrochloric or nitric acid having concentration in the range of 1 to 10 N at a temperature in the range of 75 to 100° C. for a specified period in the range of 1 to 6 hours to remove acid soluble impurities as filtrate. The residue is washed with demineralized water till free from acid.
iii. digesting the acid treated Kimberlite tailing having chemical composition in the range of $SiO_2$ 73-77%, $R_2O_3$ 3-4%, $TiO_2$ 10-13%, CaO+MgO 0.5-1.0% and loss on ignition 5-6%, with an alkali such as sodium hydroxide solution having concentration in the range of 6 to 10 percent at a temperature in the range of 95-200° C. for a period of 1 to 6 hours either in an open vessel or in a closed system to prepare sodium silicate having 13-21% $SiO_2$ and 4-7% $Na_2O$ with molar ratio of $SiO_2:Na_2O$ in the range of 2.8-3.3.
iv. adding calculated quantity of caustic soda solution to sodium silicate to adjust the $Na_2O/SiO_2$ mole ratio in the range of 0.5 to 0.8 and $H_2O/Na_2O$ mole ratio in the range of 30 to 40.
v. preparing sodium aluminate solution by dissolving required quantity of alumina trihydrate in sodium hydroxide solution at 70 to 100° C. The $Na_2O/Al_2O_3$ mole ratio in the solution is in the range of 1.8 to 2.2 and the $H_2O/Na_2O$ mole ratio is in the range 25 to 30.
vi. removing the insoluble impurities present in sodium aluminate solution either by conventional filtration technique or by flocculating and settling it using commercially available flocculating agents.
vii. dosing the sodium aluminate solution to the sodium silicate solution under continuous stirring at ambient temperature in the range of 25 to 40° C. and in a specified period in the range of 30 to 120 minutes to form aluminosilicate gel.
viii. heating the gel having composition 3.2±0.1 $Na_2O$: 2.0±0.2 $SiO_2$: $Al_2O_3$: 105±10 $H_2O$ in the temperature range of 70 to 100° C. for a time in the range of 1 to 5 hours thereby converting the amorphous aluminosilicate gel to crystalline Zeolite-A.
ix. cooling the product slurry to <50° C. and separating the product by conventional filtration technique. The filtrate mainly containing NaOH and minor quantities of $SiO_2$ & $Al_2O_3$ is stored in a storage tank and may be recycled in the process.
x. washing the wet cake of the product with demineralized water till the pH of the wash water is between 11 and 10.5.
xi. drying the washed wet cake of the product containing 40 to 50% moisture in a dryer at 110° C. for 5 to 7 hours.
xii. pulverizing the dried lumps of the product using micro or impact type pulverizer and the powder product is stored in appropriate container or silos. This product is industrially useful as detergent builder.

This Zeolite-A is obtained as a fine powder having whiteness index more than 98%, calcium binding capacity 160-170 mg CaO/g of absolute dry zeolite, crystallinity greater than 98% and average particle size less than 5.0 microns.

Kimberlite tailing passing through 60 Mesh and having chemical constituents in range $SiO_2$ 30-32%, $Al_2O_3$ 2-5%, $TiO_2$ 5-8%, CaO 8-10%, MgO, 20-24%, $Fe_2O_3$ 5-11% and loss on ignition 13-15% is used as starting material for preparing detergent grade Zeolite-A. Kimberlite tailings are treated with mineral acid like HCl and $HNO_3$ in a concentration range of 1 to 10 N and at elevated temperature in the range of 75 to 100° C. for a specified period in the range of 1 to 6 hours to remove acid soluble impurities. Acid treated Kimberlite tailing with chemical composition in range of $SiO_2$ 73-77%, $R_2O_3$ 3-4%, $TiO_2$ 10-13%, CaO+MgO 0.5-1.0% and loss on ignition 5-6% is then treated with sodium hydroxide solution in the concentration range of 6 to 10% at either boiling temperature in an open vessel or at higher temperature in range of 95 to 200° C. in a closed vessel and allowed to react for a period in the range of 1 to 6 hours. A calculated quantity of caustic soda solution is added to sodium silicate solution and the $Na_2O/SiO_2$ mole ratio is be varied in the range of 0.6 to 1.0. The sodium silicate solution may have $H_2O/Na_2O$ mole ratio in the range of 30 to 40.

Aluminum trihydrate powder having $Al_2O_3$ content in the range 63 to 65% is added to a requisite quantity of caustic soda solution and the mass heated in the temperature range of 70 to 100° C. till complete dissolution takes place. The $Na_2O/Al_2O_3$ mole ratio in the solution is varied in the range of 1.8 to 2.2 and $H_2O/Na_2O$ mole ratio in the range of 25 to 30.

The sodium aluminate solution is either filtered by conventional technique or insoluble matters are flocculated and settled using commercially available flocculating agents. The sodium aluminate solution is then added to the sodium silicate solution under continuous stirring at ambient temperature in the range of 25 to 40° C. ad in a specified period in the range of 30 to 120 minutes to form an aluminosilicate gel containing amorphous aluminosilicate. The aluminosilicate gel has a composition 3.2±0.1 $Na_2O$: 2.0±0.2 $SiO_2$: $Al_2O_3$: 105±10$H_2O$ is agitated at room temperature for 10 to 15 minutes. The gel containing amorphous aluminosilicate is then crystallized in the temperature range of 70 to 100° C. for a time in the range of 1 to 5 hours to convert the amorphous solid to crystalline Zeolite-A.

After completion of Zeolite-A formation the product slurry is cooled down in a stainless steel jacketed reactor and the product separated by conventional filtration technique. The filtrate mainly containing NaOH and minor quantities ties of $SiO_2$ and $Al_2O_3$ is stored in the proper storage tank and can be recycled in the process. The wet cake of the product Zeolite-A is washed with demineralized water till the pH of the wash water is between 10.5 and 11. The washed wet cake of product contains 40 to 50% moisture and is dried in dryer at 110° C. for 5 to 7 hours. The dried lumps of the product are subjected to pulverization in micro or impact type Pulverizer and the powder product is stored in appropriate container or silos.

Kimberlite tailing generated as solid waste during diamond mining contains silica as $SiO_2$ 30-32%, Aluminum as $Al_2O_3$ 2-5%, Titanium as $TiO_2$ 5-8%, calcium as CaO 8-10%, Magnesium as MgO 20-24%, Iron as $Fe_2O_3$ 5-11% and loss on ignition 13-15%. Moreover, the X-Ray diffraction analysis indicated that Kimberlite contains Serpentine as a major mineral constituent. Serpentine is a layered material. It is possible to destroy the layered structure of Serpentine by chemical treatment. This produces silica in active form and can be used to prepare other siliceous materials.

Considering the above points, it was thought to enrich the silica content of Kimberlite tailing either physically or chemically. Physical methods such as sieving, froth-floatation, sedimentation and hydro cyclone separation were considered, but were not tried since such separation is based on either difference in particle size or density of the material. Chemical and mineralogical analysis led us to believe that the constituents present in Kimberlite are integral part of the material and are therefore not easy to separate by physical methods.

Therefore, only chemical treatment was tied. Treatment of Kimberlite tailing with alkali solution resulted in leaching of aluminum in form of sodium aluminate and of titanium in form of sodium titanate along with leaching of silica as sodium silicate. During storage of such leachate hydrolysis takes place due to which some solids separate out. Thus, the leachate was not stable on storage. Therefore, alkali treatment of tailings was not considered feasible.

It was decided to subject the Kimberlite, tailing to acid treatment. When Kimberlite tailing is treated with mineral acid like HCl and $HNO_3$ in the concentration range of 1 to 10 N and at elevated temperature in the range of 75 to 100° C. for a specified period in the range of 1 to 6 hours the acid soluble impurities could be removed effectively as evidenced by the chemical composition of the acid treated Kimberlite tailing i.e. $SiO_2$ 73-77%, $R_2O_3$ 3-4%, $TiO_2$ 10-13%, CaO+MgO 0.5-1.0% and loss on ignition 5-6%. For preparing sodium silicate, the acid treated Kimberlite tag was digested under controlled conditions with NaOH solution keeping solid to liquid ratio as 1:4. This has produced sodium silicate having 13-21% $SiO_2$ and 4-7% $Na_2O$ with molar ratio of $SiO_2:Na_2O$=2.8-3.3. This sodium silicate was stable on storage.

According to batch size, gel composition and contents of sodium silicate, sodium aluminate solution is prepared. This is added at a controlled rate and at ambient temperature to sodium silicate solution taken previously in a stainless steel reactor. Slurry of reaction mixture is allowed to crystallize at temperature 70-100° C. for 1 to 5 hours until Zeolite-A formation takes place. Zeolite-A slurry is filtered and washed till filtrate pH was ~11 to 10.5. Wet cake thus obtained is dried in a dryer and dry powder was pulverized and subjected to analysis. The comparison of the properties of detergent builder Zeolite-A produced according to present invention (Example 10) and SASIL (Degussa-Henkel) is given in Table 1.

The whiteness index of the product was determined using a Digital Reflectance Meter (Photo Electric Instruments (P) Ltd., Jodhpur, India). Calcium binding capacity is determined by measuring the uptake of calcium by one gram of Zeolite-A from one liter of water having 30 degree hardness. Average particle size is measured as dry powder using Laser diffraction method (Mastersizer 2000, particle size analyzer, Malvern, UK). The morphology of the Zeolite-A crystals was examined by Scanning Electron Microscope (LEO). Powder X-Ray diffraction analysis was performed to determine percent crystallinity using Philips MP3 X-Ray diffractometer and $CuK\alpha$ as a source of X-rays. Values of d-spacing reported in the literature for Zeolite-A (12.20±0.20, 8.60±0.20, 7.05±0.15, 4.07±0.08, 3.68±0.07, 3.38±0.06, 3.26±0.05, 2.96±0.05, 2.73±0.05, 2.60±0.05 Å) are used as the basis for the identification and quantification of crystalline phase. Chemical composition is determined by conventional wet chemical analysis methods and the pH was measured using pH meter.

The process for the production of detergent builder Zeolite-A according to the present invention uses a new kind of raw material which is a solid waste generated during diamond mining, hitherto not used for the purpose. Considering the scientific knowledge about the type of impurities present in Kimberlite tailing it was possible to remove it by acid treatment.

The inventive steps involved in the process include

Use of new kind of silica source which is a solid waste generated during diamond mining.

Using raw material (Kimberlite tailing) without pre-drying or crushing

Enrichment of silica content by removing acid soluble matters by treatment with commercially available acid.

Preparing storage stable sodium silicate by alkali treatment of silica rich-acid treated Kimberlite tailing.

Preparing detergent builder Zeolite-A using the sodium silicate prepared as above.

The following examples are given by way of illustration and therefore should not be construed to limit the scope of the present invention.

EXAMPLE 1

500 g of Kimberlite tailing was digested in a round bottom flak with 100 g NaOH and 1280 g of tap water at boiling temperature with continuous stirring for 5 hours under reflux conditions. After completion of the digestion, sodium silicate was separated by filtration. For the preparation of sodium aluminate solution 7.9 g of NaOH and 6.3 g of aluminum trihydrate were dissolved in 17.4 g of water under continuous stirring and heating. 62 g of sodium silicate (having 2.93% $Na_2O$ and 7.75% $SiO_2$) was taken in a stainless steel vessel and to this sodium aluminate solution was added at the controlled rate and at ambient temperature under continuous stirring for the gel formation. It was then transferred in a closed reactor and crystallized at 95° C. for 2.5 hours. After crystallization, the product slurry was filtered and washed with deionized water till the pH of the filtrate was ~10.5. Wet cake was dried in oven at 110° C. for 6 hours. X-Ray diffraction analysis of this product showed a pattern that matches with reported values for Zeolite-A.

EXAMPLE 2

500 g of Kimberlite tailing was digested in a round bottom flask with 100 g NaOH and 1280 g of tap water at boiling temperature with continuous stirring for 5 hours under reflux conditions. After completion of the digestion, sodium silicate was separated by filtration. For the preparation of sodium aluminate solution 7.9 g of NaOH and 6.3 g of aluminum trihydrate were dissolved in 17.4 g of water under continuous stirring and heating. 62 g of sodium silicate (having 2.93% $Na_2O$ and 7.75% $SiO_2$) was taken in a stainless steel vessel and to this sodium aluminate solution was added at the controlled rate and at ambient temperature under continuous stiffing for the gel formation. It was then transferred in a closed reactor and crystallized at 95° C. for 1.0 hours. After crystallization, the product slurry was filtered and washed with deionized water till the pH of the filtrate was ~10.5. Wet cake was dried in oven at 110° C. for 6 hours. X-Ray diffraction analysis indicated that the product obtained is amorphous phase which may be due to insufficient crystallizations time.

EXAMPLE 3

72 g of Kimberlite tailing was digested in a round bottom flask with 20 g NaOH and 200 g of tap water at boiling temperature with continuous stag for 5 hours under reflux conditions. After completion of digestion, sodium silicate was separated by filtration. For preparing sodium aluminate solution 7.44 g of NaOH and 6.28 g of aluminum trihydrate were dissolved in 54.46 g of water under continuous stirring and heating. 25.20 g of sodium silicate (having 8.62% $Na_2O$ and 19.05% $SiO_2$) was taken in a stainless steel vessel and to this sodium aluminate solution was added at a controlled rate and at ambient temperature under continuous stirring for gel formation. After preparation of gel, 100 mg of Zeolite-A crystals were added as seeds. It was then transferred in a closed reactor and crystallized at 95° C. for 1.0 hour. After crystallization, product slurry was filtered and washed with deionized water till pH of filtrate was ~10.5. Wet cake was dried in oven at 110° C. for 6 hours. X-Ray diffraction analysis indicated that the product obtained is amorphous phase which may be due to insufficient crystallizations time. This also inferred that sending was not beneficial.

EXAMPLE 4

500 g of Kimberlite tailing was digested in a round bottom flask with 400 g NaOH and 1300 g of tap water at boiling temperature with continuous stirring for 5 hours under reflux conditions. After completion of the digestion, sodium silicate was separated by filtration. For the preparation of sodium aluminate solution 2.7 g of NaOH and 6.27 g of aluminum trihydrate were dissolved in 40.74 g of water under continuous stirring and heating. 42 g of sodium silicate (having 13.64% $Na_2O$ and 11.31% $SiO_2$) was taken in a sinless steel vessel and to this sodium aluminate solution was added at the controlled rate and at ambient temperature under continuous stirring for the gel formation. It was then transferred in a closed reactor and crystallized at 95° C. for 1.0 hours. After crystallization, the product slurry was filtered and washed with deionized water till the pH of the filtrate was ~10.5. Wet cake was dried in oven at 110° C. for 6 hours. The product was found to be X-Ray amorphous.

EXAMPLE 5

200 g of Kimberlite tailing was digested in a round bottom flask with 2 lit of 6:4 HCl at boiling temperature with congruous stirring for 6 hours under reflux conditions. After completion of reaction the slurry was filtered using vacuum filter and wet cake washed thoroughly till free from acid with tap water. Then the wet cake was dried in oven at 110° C. 3.0 g Acid treated Kimberlite powder (having 80.87% $SiO_2$, 3.38% $R_2O_3$, 0.47% CaO+MgO); 5.12 g of alkali, 3.138 g of aluminum trihydrate were taken into 36.40 g of water. After mixing thoroughly, the reaction mixture was crystallized at 95° C. for 2.5, 5.5, 8.5, 21.5 and 23.5 hours. After completion of crystallization at different time, the product slurry was filtered and washed with deionized water till the pH of the filtrate was 11. Wet cake was dried in oven at 110° C. X-Ray diffraction showed that Zeolite-A formation has not taken place.

EXAMPLE 6

200 g of Kimberlite tailing was digested in a round bottom flask with 2 lit of 6:4 HCl at boiling temperature with continuous stirring for 6 hours under reflux conditions. After completion of reaction slurry was filtered using vacuum filter and wet cake washed with tap water thoroughly till free from acid. Wet cake was dried in oven at 110° C. 3.0 g Acid treated Kimberlite powder (having 85.65% $SiO_2$, 1.27% $R_2O_3$, 0.48% CaO+MgO); 5.12 g of alkali, 3.138 g of aluminum trihydrate were taken in 36.40 g water. After mixing thoroughly, reaction mixture was crystallized at 110° C. for 2.5, 5.5, 8.5, 21.5 and 23.5 hours. After completion of crystallization at different times, product slurry was filtered and washed with deionized water till pH of the filtrate was 11. Wet cake was dried in oven at 110° C. X-Ray diffraction pattern showed presence of different phases of crystalline alumino silicates such as Zeolite-A, Zeolite-X, hydroxysodalite and phillipsite along with gibbsite and Anatase phases.

EXAMPLE 7

70 g of Kimberlite tailing was treated with 1:1 HCl at 95-100° C. under continuous stirring keeping solid to liquid ratio 1:10 for 5 hrs, then the slurry was filtered and washed thoroughly till free from acid with tap water and dried at 110° C. For the preparation of sodium silicate 16 g of NaOH was dissolved in 200 ml of water and taken in to stainless steel autoclave. To this, 50 g of acid treated Kimberlite was added under continuous stirring. Then the reactor was closed and heated for 5 hours at 150° C. under autogenous pressure conditions. After completion of reaction sodium silicate was separated by filtration. For the preparation of sodium, aluminate solution 5.91 g of NaOH, 4.48 g of aluminum trihydrate and 26.25 g of water were mixed under continuous stirring and heating till a clear solution is obtained. 25.54 g of sodium silicate (having 4.25% $Na_2O$ and 13.4% $SiO_2$) was taken in a stainless steel reactor and to this sodium aluminate solution was added at the controlled rate under continuous stirring for the gel formation. It was then transferred in the Teflon bombs for hydrothermal treatments for 0.5, 1.5, 2.5, 3.5 and 4.5 hours of crystallization at 95° C. After crystallization slurry was filtered and washed with deionized water till the pH of the filtrate was 11. Wet cake was dried in oven at 110° C. X-Ray diffraction on results showed the presence of highly crystalline phase of Zeolite-A for all crystallization time except for 0.5 hr.

EXAMPLE 8

2.7 kg of Kimberlite tai was treated with 1:1 HCl at 95-100° C. under continuous stirring keeping solid to liquid ratio 1:4 for 3 hours. The slurry was then filtered and washed thoroughly with tap water till free from acid and dried in oven at 110° C. For the preparation of sodium silicate 0.64 kg of NaOH was dissolved in 8 lit of water and taken in a stainless steel reactor. To this 2 kg of acid treated Kimberlite was added under continuous stirring. Then the reacting mass was heated at boiling temperature for 3.5 hours. After completion of reaction time sodium silicate was separated by filtration. For the preparation of sodium aluminate solution 250 g of NaOH, 190 g of aluminum trihydrate and 1390 g of water were mixed and dissolved under continuous siring and heating. Sodium aluminate solution was filtered to remove insoluble impurity. 1000 g of sodium silicate (having 4.7% $Na_2O$ and 14.5% $SiO_2$) was taken in stainless steel reactor and to this sodium aluminate solution was added at the controlled rate and at ambient temperature under continuous stirring for the gel formation Temperature of the gel was raised to 95° C. and maintained for 1 hour for the crystallization of Zeolite-A. After completion of crystallization, the product slurry was filtered aid washed with deionized water till the pH of the filtrate was 11. Wet cake was dried in oven at 110° C. X-Ray diffraction showed that the product obtained is Zeolite-A. XRD pattern of this sample matches with the reported XRD pattern of Zeolite-A.

EXAMPLE 9

2.7 kg of Kimberlite tailing was treated with 1:1 HCl at 95-100° C. under continuous stirring keeping solid to liquid ratio 1:4 for 3 hours. The slurry was then filtered and washed with tap water till wet cake becomes acid free. Then it was dried in oven at 110° C. and the dried solid was used for the preparation of sodium silicate. For the preparation of sodium silicate 0.64 kg of NaOH was dissolved in 8 lit of water and taken in to stainless steel autoclave. To this 2 kg of acid treated Kimberlite was added under continuous stirring. Then the reactor was heated at boiling temperature under reflux conditions for 3.5 hours. After completion of reaction, sodium silicate was separated by filtration. 288 g of sodium silicate (having 4.78% $Na_2O$ and 13.9% $SiO_2$) was taken in stainless steel reactor. For the preparation of sodium aluminate solution 68 g of NaOH, 53 g of aluminum trihydrate and 370 g of water were mixed under continuous stirring and heated till the solution becomes clear. Then it was filtered to remove insoluble impurity. Sodium aluminate solution was then added in to sodium silicate previously taken in stainless steel reactor at controlled rate and at ambient temperature under continuous stirring within 1 hour. Then the reaction mixture was crystallized at 93-95° C. for 1 hr. After crystallization, the slurry was filtered and washed with deionized water till the pH of the filtrate was 11. Wet cake was dried in oven at 110° C. X-Ray diffraction showed that product obtained was Zeolite-A, XD of this sample matches with the reported pattern of XRD of Zeolite-A.

EXAMPLE 10

23 Kg of Kimberlite tailing was treated with 1:1 HCl at 95-100° C. under continuous stirring keeping solid to liquid ratio 1:4 for 3 hours. The slurry was then filtered and washed with tap water till wet solid cake becomes acid free. The it was dried in oven at 110° C. For the preparation of sodium silicate 5.44 kg of NaOH was dissolved in 68 liter of water and taken in a stainless steel reactor. To this 17 kg of acid treated Kimberlite was added under continuous stirring. Then the reactor was heated for 3.5 hours at boiling temperature under reflux conditions. After completion of reaction the slurry was filtered and sodium silicate was collected as filtrate. 22.47 kg of sodium silicate (having 4.77% $Na_2O$ and 14.63% $SiO_2$) was taken in stainless steel reactor. For preparation of sodium aluminate solution 5.68 kg of NaOH, 4.3 kg of aluminum trihydrate and 32.30 kg of water were mixed and dissolution completed by heating under continuous stirring. Insoluble impurities of sodium aluminate were separated by filtration. After filtration, sodium aluminate solution was added in to sodium silicate previously taken in stainless steel reactor at controlled rate and at ambient temperature under continuous stirring within 1 hour. Then the reaction mixture was crystallized at 95° C. for 1 hour. After crystallization, the slurry was filtered and washed with deionized water till the pH of the filtrate was 11. Wet cake was dried in oven at 110° C. X-Ray diffraction pattern showed that product obtained is Zeolite-A.

Figure 1:
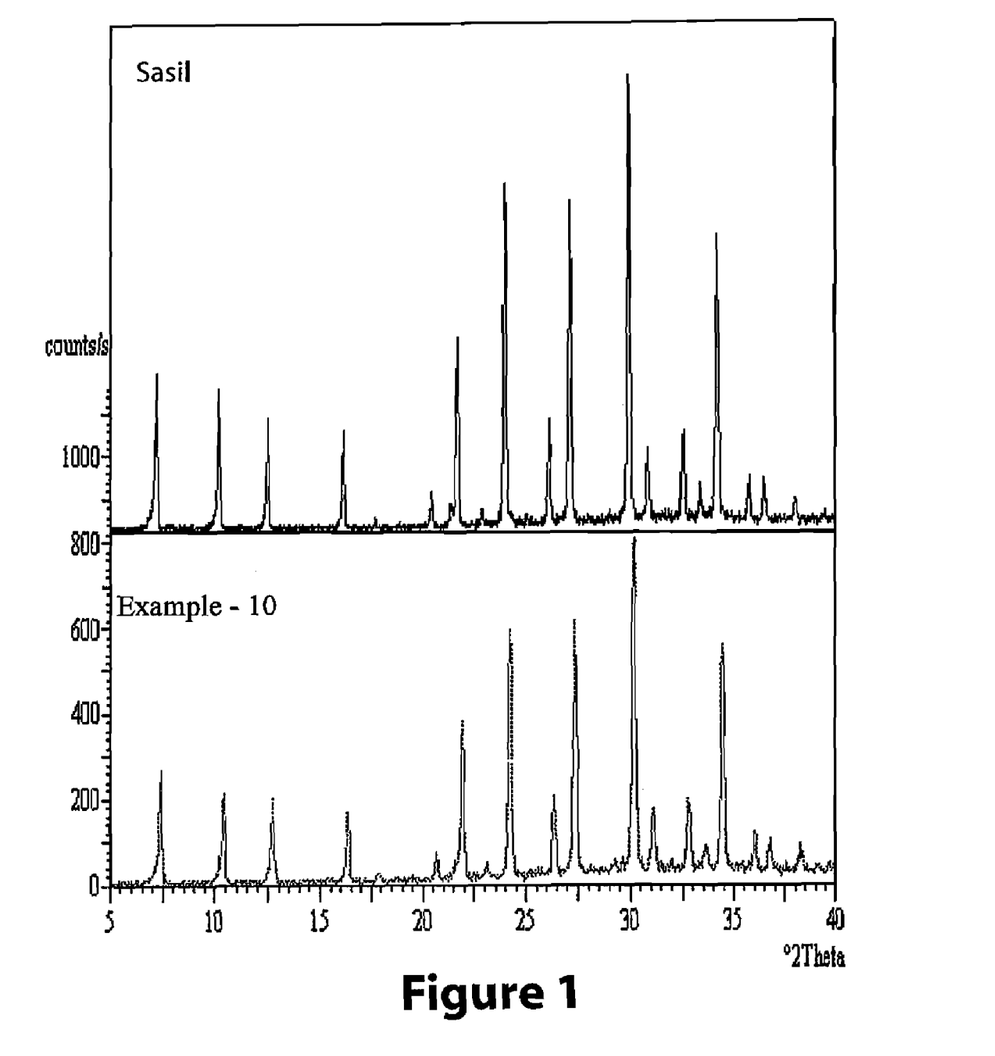
FIG. 1 represents XRD patterns of SASIL (Degussa-Henkel product) and CSMCRI 4A (produced as per Example 10 of the present invention).
Figure 2:
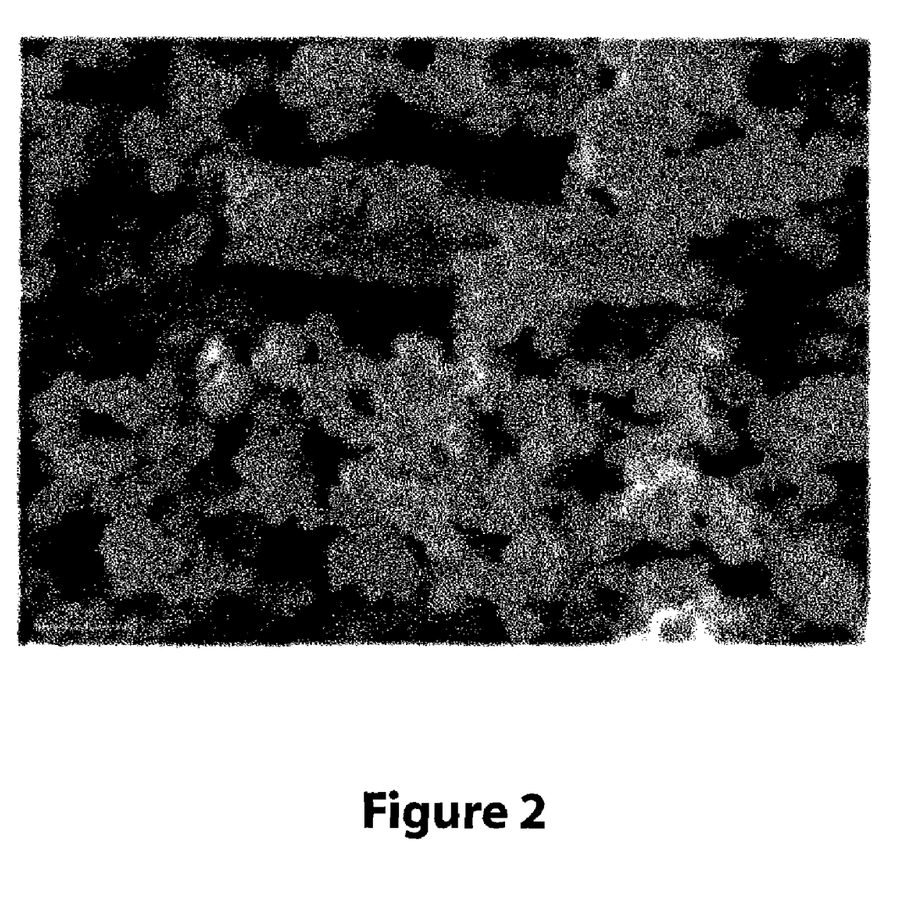
FIG. 2 represents SEM of the product detergent builder Zeolite-A prepared as in Example 10.

X-Ray diffraction patterns of the product (Example 10) and SASIL are shown in FIG. 1. SEM of the product showed Cubic crystal stricture of Zeolite-A with rounded corners and edges having average particle size of less than 4 microns (FIG. 2). The present invention provides a flexible process leading to a product of international quality. Furthermore, the process is cost-effective because of the utilization of Kimberlite a solid waste generated from diamond mining.

TABLE 1

Comparison of properties of detergent builder Zeolite-A produced as per the present invention (Example 10) and SASIL (Degussa -Henkel).

| Property Appearance: | Example 10 Fine powder | SASIL Fine powder |
|---|---|---|
| Whiteness index, %, | >98 | >95 |
| Calcium Binding Capacity, mg CaO/g of absolute dry zeolite | 160-170 | >155 |
| Loss on ignition, (1 hour at 800° C.), % | 20-22 | 21.5-22.5 |
| pH of 5% aqueous slurry | 11.0 | ~11 |
| Average Particle Size, μm, | ~4.0 | <5.0 |
| Chemical Analysis | | |
| $SiO_2$, % | 33-36 | 32.5-33.5 |
| $Al_2O_3$, % | 27-29 | 27.5-28.5 |
| $Na_2O$, % | 14-16 | 7.5 |
| Crystallinity, %, | >98 | >98 |
| Bulk Density, g/ml | 0.45-0.55 | ~0.40 |

The main advantages of the present invention are:
1. Kimberlite tailings generated as a solid waste during diamond mining is converted to a detergent builder Zeolite-A via production of sodium silicate, and the product is value added material suitable for applications in detergent industry.
2. Alternative source of silica for producing detergent builder Zeolite-A for commercial application has been found.
3. Acid treatment of Kimberlite tailing provided special advantage of removing all the major acid soluble impurities and converting it in to active silica source.
4. Filtrate collected after acid treatment of Kimberlite tailing can be used to recover magnesium and iron salts.
5. The treatment of alkali with acid treated Kimberlite provided special advantage of producing sodium silicate suitable for wide commercial applications.
6. The process according to the present invention involves simple unit operations.
7. The process does not involve high temperature fusion and is not energy intensive.
8. The present process contributes towards solid waste utilization thereby improving the environmental quality of diamond mining and makes diamond mining economical and eco-friendly.

We claim:
1. A process for preparing Zeolite-A from Kimberlite tailings, the process comprising:
   (i) treating sieved Kimberlite tailings fraction with a mineral acid to remove acid soluble impurities as filtrate and obtain an acid treated Kimbertlite tailings residue;

(ii) washing the acid treated Kimberlite tailings residue with demineralized water until the residue is free from acid;
(iii) digesting the acid treated Kimberlite tailing residue with an alkali to obtain sodium silicate;
(iv) adding a caustic soda solution to the sodium silicate;
(v) preparing a sodium aluminate solution by dissolving alumina trihydrate in a sodium hydroxide solution;
(vi) removing insoluble impurities present in the sodium aluminate solution;
(vii) dosing the sodium aluminate solution to the sodium silicate solution to form an amorphous aluminosilicate gel;
(viii) heating the amorphous aluminosilicate gel to convert the amorphous aluminosilicate gel to crystalline Zeolite-A in a product slurry;
(ix) cooling the product slurry and separating Zeolite-A as a wet cake from a filtrate;
(x) washing the wet cake with demineralized water;
(xi) drying the washed wet cake of the product;
(xii) pulverizing the dried wet cake.

2. A process as claimed in claim 1 wherein the Zeolite-A is obtained as a fine powder with whiteness index of >98% a calcium binding capacity of 160-170 mg CaO/g of absolute dry zeolite, a crystalinity >98% and an average particle size of <5.0 microns.

3. A process as claimed in claim 1, wherein the Kimberlite tailings are sieved by passing through 60 Mesh.

4. A process as claimed in claim 1 wherein the Kimberlite tailing starting material has chemical constituents in the range of $SiO_2$ 30-32%, $Al_2O_3$ 2-5%, $TiO_2$ 5-8%, CaO 8-10%, MgO 20-24%, and $Fe_2O_3$ 5-11% and loss on ignition of 13-15%.

5. A process as claimed in claim 1 wherein the mineral acid is selected from the group consisting of HCl and $HNO_3$ in a concentration in the range of 1 to 10 N.

6. A process as claimed in claim 1 wherein the acid treatment is carried out at a temperature in the range of 75 to 100° C. for a period in the range of 1 to 6 hours.

7. A process as claimed in claim 1, wherein the acid treated Kimberlite tailing residue has a chemical composition in the range of $SiO_2$ 73-77%, $R_2O_3$ 3-4%, $TiO_2$ 10-13%, and CaO +MgO 0.5-1.0% and a loss on ignition of 5-6%.

8. A process as claimed in claim 1, wherein the acid treated Kimberlite tailing residue is treated in step (iii) with a sodium hydroxide solution in a concentration in the range of 6 to 10%.

9. A process as claimed in claim 1, wherein the alkali treatment in step (iii) is carried out at either boiling temperature in an open vessel or at a temperature in the range of 95 to 200° C. in a closed vessel and for a period in the range of 1 to 6 hours.

10. A process as claimed in claim 1, wherein a $Na_2O/SiO_2$ mole ratio in step (iv) is varied in the range of 0.6 to 1.0.

11. A process as claimed in claim 1, wherein in step (iv) a $Na_2O/SiO_2$ mole ratio is in the range of 0.5 to 1.0 and a $H_2O/Na_2O$ mole ratio is in the range of 30 to 40.

12. A process as claimed in claim 1, wherein the aluminum trihydrate comprises an $Al_2O_3$ content in the range of 63 to 65%, and is added to the sodium hydroxide solution and heated to temperature in the range of 70 to 100° C. until complete dissolution takes place.

13. A process as claimed in claim 1, wherein a $Na_2O/Al_2O_3$ mole ratio in the sodium aluminate solution obtained in step (v) is varied in the range of 1.8 to 2.2 and a $H_2O/Na_2O$ mole ratio in the range of 25 to 30.

14. A process as claimed in claim 1, wherein in step (vi) the insoluble impurities in step (vi) are removed from the sodium aluminate solution by filtration or flocculated and settled using a flocculating agent.

15. A process as claimed in claim 1, wherein in step (vii) the sodium aluminate solution of step (vi) is added to the sodium silicate solution of step (iv) under continuous stirring at a temperature in the range of 25 to 40° C. and for a period of 30 to 120 minutes.

16. A process as claimed in claim 1 wherein the aluminosilicate gel comprises 3.2±0.1 $Na_2O$: 2.0±0.2 $SiO_2$: $Al_2O_3$: 105±10 $H_2O$ and is agitated at room temperature for 10 to 15 minutes.

17. A process as claimed in claim 1, wherein the gel containing amorphous aluminosilicate is crystallized by heating at a temperature in the range of 70 to 100° C. for a period in the range of 1 to 5 hours to convert the amorphous aluminosilicate to crystalline Zeolite-A.

18. A process as claimed in claim 1, wherein the product slurry obtained at the end of step (viii) is cooled in step (ix) in a stainless steel jacketed reactor and the product Zeolite-A is separated by filtration.

19. A process as claimed in claim 1 wherein the filtrate obtained in step (ix) contains NaOH and minor quantities of $SiO_2$ and $Al_2O_3$ and is recycled in the process.

20. A process as claimed in claim 1 wherein the wet cake is washed with demineralized water until a pH of the wash water is between 10.5 and 11.

21. A process as claimed in claim 1, wherein the washed wet cake contains 40 to 50% moisture and is dried in a dryer at 110° C. for 5 to 7 hours.

22. A process as claimed in claim 1, wherein the dried wet cake is pulverized in micro or impact type pulverizer.

23. A process as claimed in claim 1, wherein the Kimberlite tailings are solid waste generated during diamond mining.

24. A process for preparing detergent builder Zeolite-A from Kimberlite tailings generated as solid waste during diamond mining and having chemical constituents in the range of $SiO_2$ 30-32%, $Al_2O_3$ 2-5%, $TiO_2$ 5-8%, CaO 8-10%, MgO 20-24%, and $Fe_2O_3$ 5-11% and a loss on ignition of 13-15%, the process comprising:
(i) passing Kimberlite tailing through a 60 mesh screen and treating the sieved fraction with 1 to 10 N hydrochloric or nitric acid at temperature in the range of 75 to 100° C. for a period in the range of 1 to 6 hours to remove acid soluble impurities,
(ii) recovering acid treated Kimberlite tailings after washing with demineralized water until free from acid and digesting acid treated Kimberlite tailing having a chemical composition in the range of $SiO_2$ 73-77%, $R_2O_3$ 3-4%, $TiO_2$ 10-13% and CaO+MgO 0.5-1.0% and loss on ignition of 5-6% with an alkali comprising a sodium hydroxide solution having concentration in the range of 6 to 10 percent at 95-200° C. for a period of 1 to 6 hours either in an open vessel or in a closed system to prepare sodium silicate having 13-21% $SiO_2$ and 4-7% $Na_2O$ with molar ratio of $SiO_2$:$Na_2O$=2.8-3.3,
(iii) obtaining a sodium silicate solution wherein a $Na_2O/SiO_2$ mole ratio is in the range of 0.5 to 0.8 and a $H_2O/Na_2O$ mole ratio is in the range of 30 to 40 by adding sodium hydroxide to the sodium silicate,
(iv) dosing a sodium aluminate solution, prepared separately by dissolving aluminum trihydrate in sodium hydroxide solution at 70 to 100° C. so as to obtain a $Na_2O/Al_2O_3$ mole ratio in the range of 1.8 to 2.2 and $H_2O/Na_2O$ mole ratio in the range 25 to 30, to the sodium silicate solution under continuous stirring at ambient temperature in the range of 25 to 40° C. and in a specified period in the range of 30 to 120 minutes to form aluminosilicate gel, comprising 3.2 ±0.1 $Na_2O$: 2.0±0.2 $SiO_2$: $Al_2O_3$: 105±10 $H_2O$, (v) heating the aluminosilicate gel at in a temperature in the range of 70 to 100° C. for a time in the range of 1 to 5 hours, thereby converting the amorphous aluminosilicate gel to crystalline Zeolite-A in a product slurry, (vi) cooling the product slurry to <50° C. and separating the Zeolite-A product by filtration, (vii) washing the wet cake of the product with demineralized water until a pH of the wash water is between 11 and 10.5, and (viii) drying the washed wet cake containing 40 to 50% moisture in a dryer at 110° C. for 5 to 7 hours followed by pulverizing the dried wet cake using a micro or impact type pulverizer to obtain Zeolite-A as a fine powder.

* * * * *